(12) United States Patent
Robinson

(10) Patent No.: US 10,926,809 B2
(45) Date of Patent: Feb. 23, 2021

(54) MULTI-DIMENSIONAL LOAD STRUCTURE

(71) Applicant: Gemini Group, Inc., Bad Axe, MI (US)

(72) Inventor: Mark Robinson, Bad Axe, MI (US)

(73) Assignee: GEMINI GROUP, INC., Bad Axe, MI (US)

(*) Notice: Subject to any disclaimer, the term of this patent is extended or adjusted under 35 U.S.C. 154(b) by 161 days.

(21) Appl. No.: 16/110,409

(22) Filed: Aug. 23, 2018

(65) Prior Publication Data

US 2020/0062320 A1    Feb. 27, 2020

(51) Int. Cl.

| B62D 25/20 | (2006.01) |
| B62D 29/04 | (2006.01) |
| B62D 33/04 | (2006.01) |
| B32B 3/12 | (2006.01) |
| B32B 17/06 | (2006.01) |
| C03C 17/32 | (2006.01) |

(52) U.S. Cl.
CPC ....... *B62D 25/2054* (2013.01); *B62D 29/043* (2013.01); *B62D 33/046* (2013.01); *B32B 3/12* (2013.01); *B32B 17/065* (2013.01); *B32B 2605/00* (2013.01); *C03C 17/322* (2013.01)

(58) Field of Classification Search
CPC .......... B62D 25/2054; B62D 29/043; B62D 33/046; B32B 3/12; B32B 17/065; B32B 2605/00; B32B 5/024; B32B 3/28; B32B 7/12; B32B 2266/0278; B32B 5/245; B32B 2255/02; B32B 2255/26; B32B 7/022; B32B 21/10; B32B 27/12; B32B 2419/00; B32B 2479/00; B32B 2262/101; B32B 1/00; C03C 17/322

USPC .......................................... 296/184.1
See application file for complete search history.

(56) References Cited

U.S. PATENT DOCUMENTS

| 4,626,023 A | 12/1986 | Lutz |
| 5,002,334 A | 3/1991 | Meiler et al. |
| 6,474,729 B2 | 11/2002 | Patz et al. |
| 7,017,981 B2 | 3/2006 | Strohmavr et al. |
| 7,128,365 B2 | 10/2006 | Kiesewetter et al. |
| 7,165,362 B2 * | 1/2007 | Jobs .................. B32B 17/10009 52/179 |
| 7,462,311 B2 | 12/2008 | Kralik et al. |

(Continued)

FOREIGN PATENT DOCUMENTS

| GB | 2531942 A | 5/2016 |
| JP | H08169057 A | 7/1996 |

OTHER PUBLICATIONS

EESR; Application No. EP 19192430 dated Dec. 17, 2019.

*Primary Examiner* — Pinel E Romain
(74) *Attorney, Agent, or Firm* — Fishman Stewart PLLC

(57) ABSTRACT

An exemplary multi-dimensional load structure may include a base panel having a tiered structure with an upper layer, a lower layer, and at least one interior layer therebetween. The load structure may also have a glass layer applied to at least surfaces of each of the upper layer, the lower layer, and the at least one interior layer not in contact with an adjacent layer. The load structure may further have a coating applied to the exterior of the glass layer. The at least one interior layer may be configured to withstand a greater compressive force than the upper layer and the lower layer and/or the upper layer and the lower layer may be lighter than the at least one interior layer.

21 Claims, 4 Drawing Sheets

(56) References Cited

U.S. PATENT DOCUMENTS

| | | |
|---|---|---|
| 7,524,389 B2 | 4/2009 | Elbs et al. |
| 7,798,565 B2 | 9/2010 | Johl et al. |
| 7,942,475 B2 | 5/2011 | Murray |
| 8,511,742 B2 | 8/2013 | Legler et al. |
| 9,090,148 B2 | 7/2015 | Kiesewetter et al. |
| 9,327,471 B2 | 5/2016 | Legler et al. |
| 9,440,679 B2 * | 9/2016 | Lee ...................... B62D 27/023 |
| 9,776,488 B2 | 10/2017 | Bowles |
| 10,400,448 B2 * | 9/2019 | Gosling ................. B44C 5/0407 |
| 2003/0218363 A1 | 11/2003 | Strohmayr et al. |
| 2004/0104600 A1 | 6/2004 | Kiesewetter et al. |
| 2005/0001347 A1 | 1/2005 | Kralik et al. |
| 2005/0003208 A1 * | 1/2005 | Graf ........................... B32B 7/02 |
| | | 428/426 |
| 2005/0029839 A1 | 2/2005 | Stemmer |
| 2005/0242469 A1 | 11/2005 | Elbs et al. |
| 2006/0108716 A1 | 5/2006 | Strohmayr et al. |
| 2009/0160210 A1 | 6/2009 | Legler et al. |
| 2010/0140984 A1 | 6/2010 | Murray |
| 2011/0101731 A1 | 5/2011 | Legler et al. |
| 2011/0114741 A1 | 5/2011 | Kaindl |
| 2011/0226312 A1 | 9/2011 | Bohm et al. |
| 2011/0262703 A1 * | 10/2011 | Legler ................... B29C 70/086 |
| | | 428/156 |
| 2011/0305869 A1 | 12/2011 | Pollak et al. |
| 2012/0231244 A1 | 9/2012 | Legler et al. |
| 2012/0308768 A1 | 12/2012 | Mishra et al. |
| 2014/0159418 A1 | 6/2014 | Kiesewetter et al. |
| 2015/0050485 A1 | 2/2015 | Wagner et al. |
| 2016/0263975 A1 | 9/2016 | Bowles |
| 2016/0263976 A1 | 9/2016 | Bowles |
| 2018/0050580 A1 | 2/2018 | Sviberg et al. |

* cited by examiner

MULTI-DIMENSIONAL LOAD STRUCTURE

FIELD OF TECHNOLOGY

The present disclosure pertains to a multi-dimensional load structure that may be employed, for example, but not limited to, in a vehicle where a load is applied, such as a floor panel, roof panel, structural member, and the like, and a method of manufacturing thereof.

BACKGROUND

Load structures, i.e., structures configured to withstand loads, are employed in all different kinds of applications, including, but not limited to, in vehicles as floor panels, roof panels, and the like. These load structures are often made of a paper honeycomb, and are typically formed as thin panels that have sections in which the contour and/or thicknesses vary. One method of forming the load structures is using corrugated wave board blocks that are shaped prior to processing. Another method of forming a load structure involves pre-molding the geometric shapes or features that add thickness, and then adding them to the main panel when it is formed. However, load structures formed from these methods may have unpredictable weak areas, which may affect the ability of the load structure to withstand loads in its normal application and use.

Accordingly, there exists a need for an improved multi-dimensional load structure and method of manufacturing thereof to increase efficiency and minimize costs of manufacturing.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

An exemplary multi-dimensional load structure may include a base panel having a tiered structure with an upper layer, a lower layer, and at least one interior layer therebetween. The load structure may also have a glass layer applied to at least surfaces of each of the upper layer, the lower layer, and the at least one interior layer not in contact with an adjacent layer. The load structure may further have a coating applied to the exterior of the glass layer. The at least one interior layer may be configured to withstand a greater compressive force than the upper layer and the lower layer and/or the upper layer and the lower layer may be lighter than the at least one interior layer. The load structure may be used in vehicle, aerospace, ship, cargo, building, furniture, and other applications in which a structure is required to handle a load.

An exemplary method for manufacturing a multi-dimensional load structure may include first assembling a lower layer, at least one interior layer, and an upper layer to form a tiered structure. The method may then include forming the tiered structure into a panel, and then applying a glass layer to surfaces of each of the upper layer, the lower layer, and the at least one interior layer not in contact with an adjacent layer. The method may then include applying a coating to the glass layer, and finally, trimming the panel into a final shape of the multi-dimensional load structure.

Figure 1A:
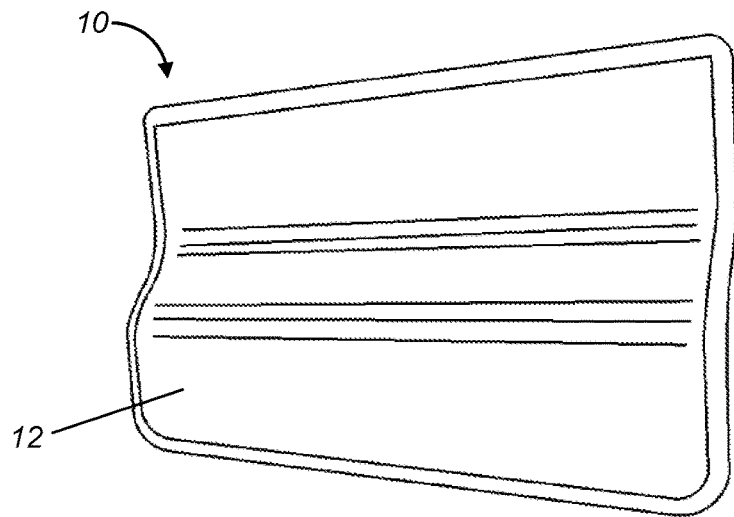
FIGS. 1A and 1B are perspective views illustrating an "A" side and "B" side of a multi-dimensional load structure according to one exemplary approach.
Figure 1B:
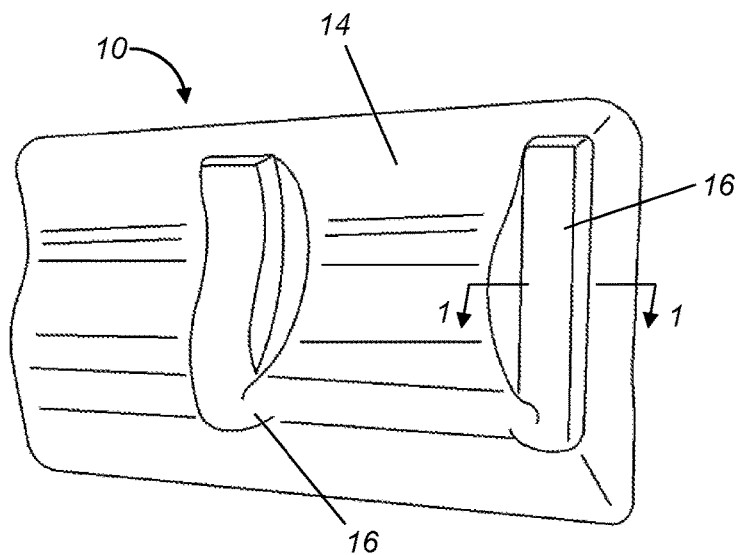
Figure 1C:
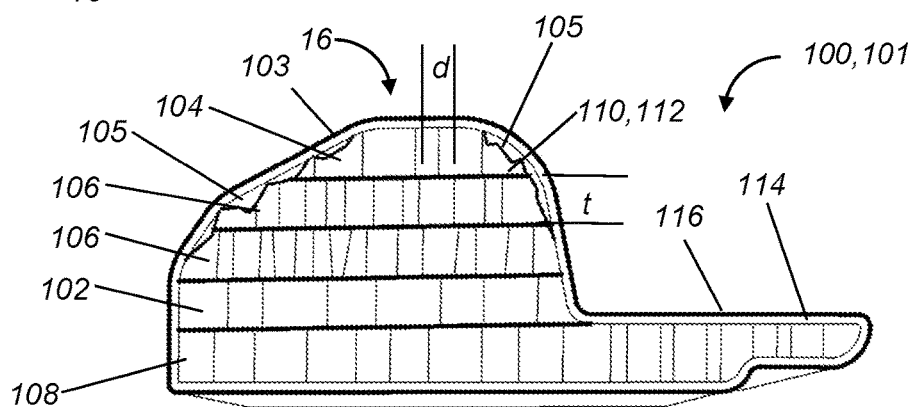
FIG. 1C is a partial, cross-sectional view, taken from line 1-1 of FIG. 1B, of the multi-dimensional load of FIGS. 1A and 1B.

Referring now to the figures, FIGS. 1A through 1C illustrate a multi-dimensional load structure 10 according to one exemplary approach. As can be seen in the figures, the load structure 10 may have varying contours and thicknesses. The sections 16 of the load structure 10 having increased thicknesses may be on a "B" side 14 of the load structure 10, as illustrated in FIG. 1B, which generally may not be visible or as readily visible, though it should be appreciated that such sections 16 may also be on an "A" side 12 of the load structure 10.

To achieve a structure with different thicknesses and/or having a curved profile 103, the load structure 10 may include a panel 100 having a tiered structure 101 in the areas of increased thickness and curved profile 103, as illustrated in FIG. 1C. The tiered structure 101 generally may have a lower layer 102, one or more interior layers 106, and an upper layer 104 stacked collectively on a base layer 108. Along the curved profile 103, the panel 100 may have deformed or crushed areas 105, where one or more of the layers 102, 104, or 106 may be deformed or crushed from its original structure during forming of the panel, as described in more detail hereinafter. While FIG. 1C illustrates two interior layers 106, it should be appreciated that there may be any number of interior layers 106, including just one. The load structure 10 also may have different numbers of interior layers 106 at different locations of the load structure 10 to form the desired shape and/or thickness. The layers 102, 104, 106, and 108 may or may not have the same thickness (t) as one or more of the other layers. Similar to the number of layers, the thicknesses of the layers may also be dependent upon the desired shape of the panel 100. For example, where the curved profile 103 has less of a slope, the thickness of the layers may be greater, and the quantity of layers may be less than areas where there is more of a slope. This may result in a smaller deformed or crushed area 105. The layers 102, 104, and 106 generally may be constructed such that the compressive force required to deform the interior layers 106 may be greater than that required to deform the lower and upper layers 102 and 104. Further, the lower and upper layers 102 and 104 may be lighter than the interior layers 106, which may help to ensure the center of the load structure, in particular, the interior layers 106, maintain structural integrity. Thus, the load structure 10 contemplates layers of varying sizes, shapes, and thicknesses.

The base layer 108 may have a layer of glass to stabilize the material of the layers at expansion during the forming process, which is described in more detail hereinafter, and to provide the fiber necessary for the composite which will form the skin of the "A side" 12 of the load structure 10. The base layer 108 generally may be large enough to accommodate handling through the forming process. The glass material may be oriented, woven, braided, random or any combination thereof, which may create the characteristics that the load structure 10 may require.

The layers 102, 104, 106, and 108 may be constructed of a material including paper, composite, thermoplastic, thermoset, or a combination thereof, and generally may have material properties required to form the panel 100. As merely one exemplary approach, one or more of the layers 102, 104, 106, and 108 may have at least one of a base weight ranging from 65 g/m2 to 212 g/m2, a density ranging from about 0.46 g/cm3 to 0.67 g/cm3, a Taber bending stiffness and (machine direction) ranging from about 1.66 gmf-cm to 61.03 gmf-cm, and a Taber bending stiffness rd (roll direction) ranging from about 0.73 gmf-cm to 23.6 gmf-cm. Each layer 102, 104, 106, and 108 may further have a honeycomb structure. The interior layers 106 generally may have a smaller cell construction than that of the lower and upper layers 102 and 104. As merely one example, the interior layers 106 may have a cell diameter (d) of 6 mm whereas the lower and upper layers 102 and 104 may have a cell diameter of 10 mm. The smaller cell construction of the interior layers 106 may allow for the greater compressive force required to deform the interior layers 106, as described above. The base layer 108 generally may be in contact with a forming tool along its entire surface. As such, the base layer 108 may be constructed with a 10 mm cell diameter honeycomb in one example.

The load structure 10 may also include paper layers 110 between each layer of the tiered structure 101. The paper generally may have a construction that may ensure that the compressive forces needed to form the panel are transferred through to the panel 100 from the forming tool, as described in more detail hereinafter, and force distortion of the paper to the outside of the panel 100. For example, the paper may be 4-40 lbs/ft$^2$, and may be, but is not limited to, kraft paper. The layers 102, 104, and 106 may be bonded together by an adhesive 112. The adhesive 112 may be water based or solvent based, and generally may be compatible with urethane, e.g., does not inhibit bonding of polyurethane to the paper, the inhibiting of bonding for which may result in fogging, odor, flammability, and the like.

The load structure 10 may also include a glass layer 114 around the panel 100. The glass may have a construction that is random, oriented, braided, woven, or any combination thereof. The load structure 10 may further have a coating 116 applied on and encapsulating the glass layer 114. The coating may be, but is not limited to, polyurethane, which may be rigid, and may be a foam, for example, 0.20 g/cc to 0.35 g/cc, or non-foaming. The amount of the coating 116 may be such that the weight is substantially equal to the weight of the glass layer 114 or as necessary to encapsulate deformed honeycomb structure.

Figure 2:
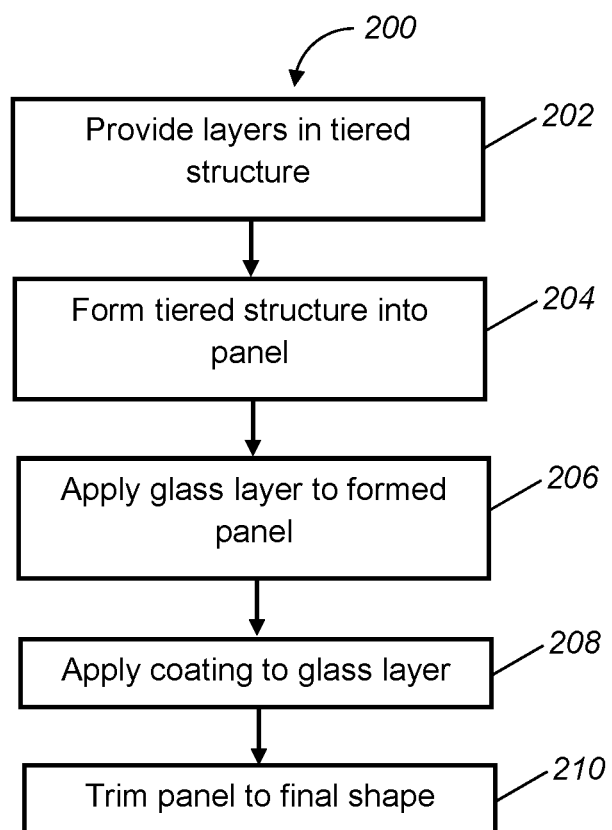
FIG. 2 is a schematic flow diagram of an exemplary method for manufacturing a multi-dimensional load structure.
Figure 3:
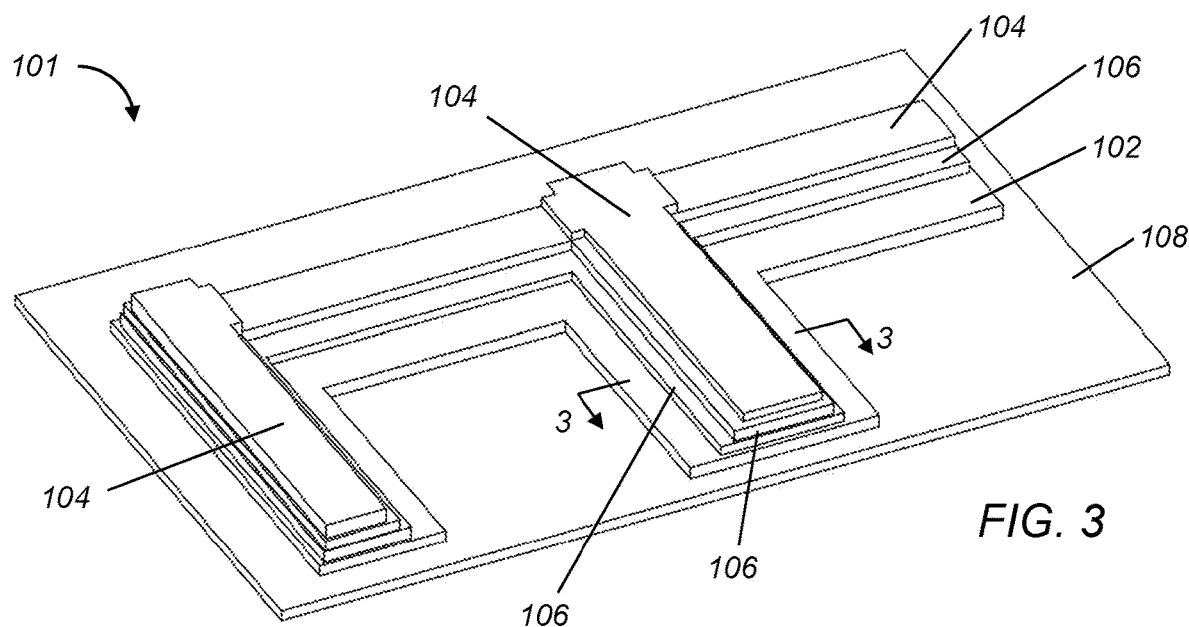
FIG. 3 is a schematic perspective view of a tiered structure of layers used to form the multi-dimensional load structure of FIGS. 1A and 1B.
Figure 5:
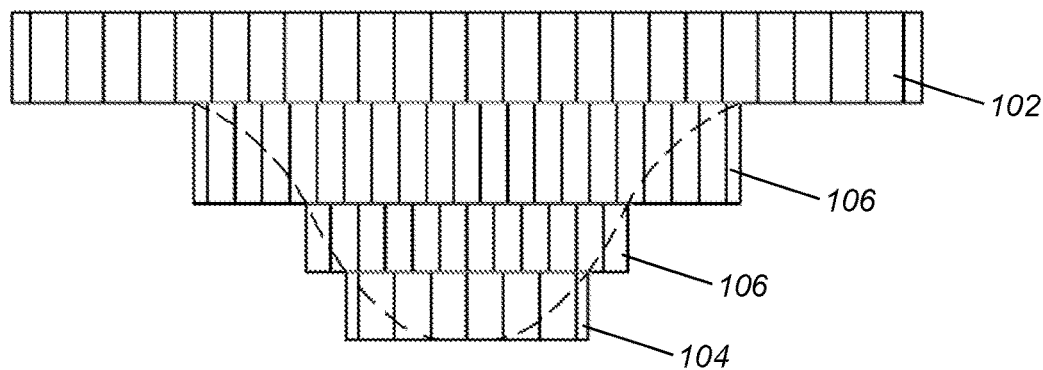
FIGS. 5-7 are schematic, partial cross-sectional views, taken from line 3-3 of FIG. 3, of the tiered structure of FIG. 3 through different steps of a forming process.

Referring now to FIG. 2, an exemplary method 200 for manufacturing a multi-dimensional load structure is illustrated. While method 200 is described hereinafter with respect to load structure 10, it should be appreciated that method 200 may be used to form any variations or embodiments of a load structure to which the steps are applicable. Method 200 generally may begin at step 202 in which the different layers, including, but not limited to, the lower layer 102, interior layers 106, and upper layers 104, may be assembled, for example, stacked, into a tiered structure 100 on a base 108 with a stepped configuration, as illustrated in FIGS. 3 and 5. It should be appreciated that the number of lower layers, upper layers, and interior layers may be the same or may be different, as illustrated, depending upon the final shape and profile of the load structure. As explained above, the layers 102, 104, and 106 may be a paper honeycomb structure, where the interior layers 106 generally have a smaller cell construction than that of the lower and upper layers 102 and 104 such that the compressive force required to deform the interior layers 106 may be greater than that required to deform the lower and upper layers 102 and 104.

Each layer may also have a paper layer 110 attached to one or more surfaces of the respective layer such that there may be a paper layer between each layer when assembled in the tiered structure 101. The paper layer 110 may be sized and located, i.e. to cover the respective surface to which the paper is attached, to be substantially equal to the area of contact between adjacent layers, where exposed surfaces of the layers do not have the paper layer. The layers with the paper layer 110 may be bonded to one another via an adhesive, which may be compatible with urethane, and may be water based or solvent based.

Figure 4:
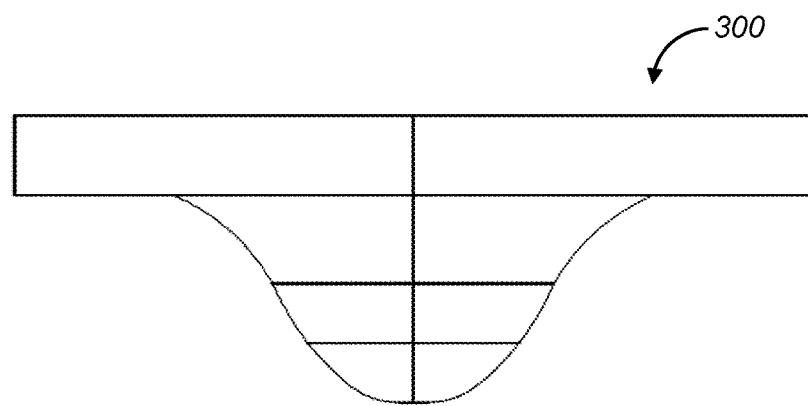
FIG. 4 is a schematic cross-sectional view of a preform mold used to shape the tiered structure of FIG. 3 into a panel.
Figure 6:
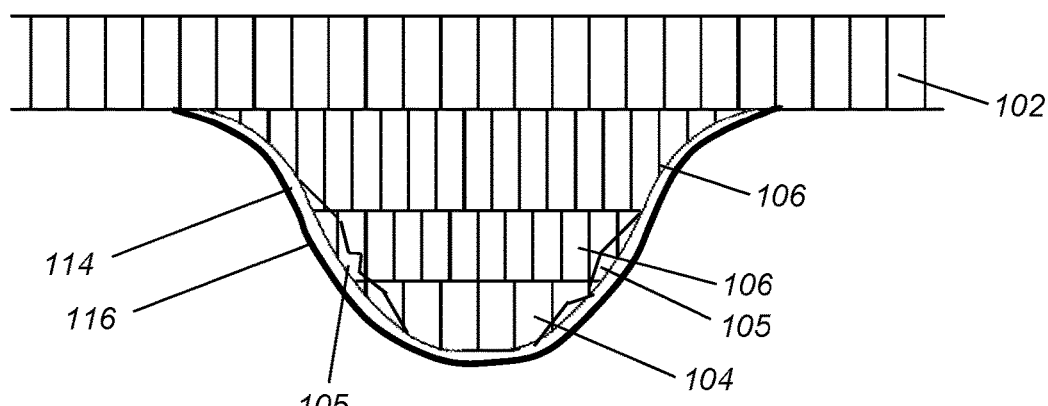
Figure 7:
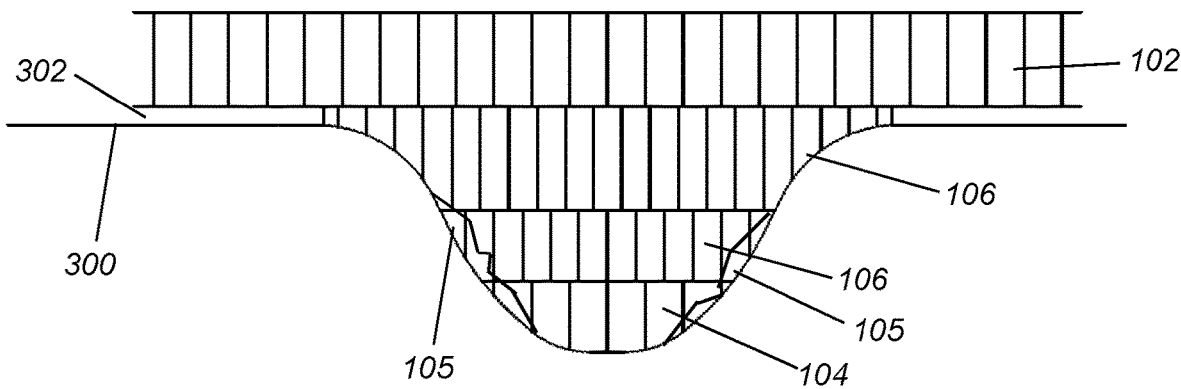

After step 202, method 200 may proceed to step 204 in which the tiered structure 101 may be formed into a panel 100, as seen in FIGS. 5 and 6. This may be done by preforming via a preform mold that defines the desired contour, i.e., has substantially the same shape as the final load structure. During such forming, one or more of the layers 102, 104, and 106 may be crushed, forming deformed or crushed areas 105, such that the tiered structure 101 may have the curved profile 103. A lower tool 300 according to one exemplary approach is illustrated in FIG. 4. When the preform mold is in an open position, the lower tool 300 may have a clearance 302 from a surface of one of the layers, as seen in FIG. 7. As merely one example, the clearance may be between 2 and 3 mm.

After step 204, method 200 may proceed to step 206 in which a glass layer 114 may be applied to the panel 100. Step 206 may include placing the glass material on the inside of the lower tool 300. The amount of glass material may be sized so as to cover the entire surface of the panel 100. As explained above, the glass material may be random, oriented, braided, woven, or any combination thereof. Any reinforcements and/or inserts needed may also be placed in the inside of the lower tool 300 at this time. Then, an adhesive may be applied, for example, by spraying, on the glass material in the lower tool 300 and/or on the panel. The adhesive generally may be urethane compatible. The preform mold may then be closed to allow the adhesive to cure.

After step 206, method 200 may proceed to step 208 in which a coating 116 may be applied to the glass layer 114. Additional material may also be added at this time to fill the geometry, where needed. As explained above, the coating 116 may be, but is not limited to polyurethane, which may be rigid and foaming or non-foaming, and the amount of coating may be such that the coating encapsulates the glass layer and has a weight that is substantially equal to the weight of the glass layer. To apply the coating 116, the panel 100 may be removed from the preform mold and placed on a load table designed to hold the panel 100 in a positive repetition. The panel 100 may then be picked off of a load station, which may be done via an end-of-arm-tool, which in turn may be attached to a robot that may transfer the panel 100 to a spray booth where the coating material, e.g., polyurethane, may be applied via spraying. The spraying may be accomplished using a fix mounted spray head or a moving spray head. The end-of-arm-tool may then transport the panel with the coating applied thereto, and transfer it back to a heated mold, which is closed and pressed until the coating has cross-linked. After the coating 116 has cured, the panel 100 may be removed from the press.

Method 200 may end at step 210 where the panel 100 may be trimmed. This may be performed via a matched steel tool, a rule die, in mold pinch, in mold by-pass, a waterjet cutting system, or the like.

The resulting panel 100 may result in a load structure 10 having varying compression, load, and performance characteristics based on a desired engineering performance behavior. Collectively, the layers 102, 104 and 106 may provide and be formed in to first, second, and/or third layers of a 3-D load structure 10 to create a composite sandwich that can have varying thicknesses, shapes, and/or densities, that may be tailored to unique product applications so as to provide enhanced performance characteristics. It will be appreciated that the number of layers can be 1–n. It will be further appreciated that the number of compound shapes can be 1–n, as is shown in exemplary FIG. 1B where at least two compound shapes are illustrated.

In general, the tiered structure of the panel is advantageous in that deformation of the layers, e.g., of the paper material of the honeycomb structure, during forming of the panel may occur on an outer periphery of the formed (molded) panel. The coating (polyurethane) may then encapsulate the deformed paper (in addition to the glass layer). This reduces the impact of the deformed paper on the structure of the final load structure, e.g., unpredictable weak areas.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A multi-dimensional load structure comprising:
   a panel having a tiered structure with an upper layer, a lower layer, and at least one interior layer therebetween;
   a glass layer applied to surfaces of each of the upper layer, the lower layer, and the at least one interior layer not in contact with an adjacent layer; and
   a coating applied to the glass layer;
   wherein at least one of:
      the at least one interior layer is configured to withstand a greater compressive force than the upper layer and the lower layer; and
      the upper layer and the lower layer are lighter than the at least one interior layer.

2. The multi-dimensional load structure of claim 1, wherein the panel has a curved profile, and at least one of the upper layer, the lower layer, and the at least one interior layer has a deformed area along the curved profile.

3. The multi-dimensional load structure of claim 1, wherein the upper layer, the lower layer, and the at least one interior layer each has a honeycomb structure.

4. The multi-dimensional load structure of claim 3, wherein the at least one interior layer has a cell construction smaller than a cell construction of the upper and lower layers.

5. The multi-dimensional load structure of claim 1, further comprising at least one layer of paper between adjacent layers of the upper layer, the at least one interior layer, and the lower layer.

6. The multi-dimensional load structure of claim 5, wherein the paper is kraft paper.

7. The multi-dimensional load structure of claim 1, wherein the glass has a configuration that is at least one of random, oriented, braided, and woven.

8. The multi-dimensional load structure of claim 1, wherein the upper layer, the at least one interior layer, and the lower layer are bonded to one another via an adhesive.

9. The multi-dimensional load structure of claim 8, wherein the adhesive is one of water based or solvent based.

10. The multi-dimensional load structure of claim 1, wherein the coating is a polyurethane.

11. The multi-dimensional load structure of claim 10, wherein the polyurethane is a rigid foam or is rigid and non-foaming.

12. A method of manufacturing a multi-dimensional load structure, comprising:
   providing a lower layer, at least one interior layer, and an upper layer to form a tiered structure;
   forming the tiered structure into a panel;
   applying a glass layer to surfaces of each of the upper layer, the lower layer, and the at least one interior layer not in contact with an adjacent layer; and
   applying a coating to the glass layer; and
   trimming the panel into a final shape;
   wherein at least one of:
      the at least one interior layer is configured to withstand a greater compressive force than the upper layer and the lower layer; and
      the upper layer and the lower layer are lighter than the at least one interior layer.

13. The method of claim 12, wherein assembling the lower layer, the at least one interior layer, and an upper layer to form a tiered structure includes bonding the layers via an adhesive.

14. The method of claim 13, wherein the adhesive is one of water based or solvent based.

15. The method of claim 12, wherein forming the tiered structure into a panel includes preforming the panel in a mold.

16. The method of claim 12, wherein applying the glass layer includes:
placing glass material in a preform mold;
spraying an adhesive onto at least one of the glass material in the preform mold and exposed surfaces of the panel; and
pressing the preform mold closed.

17. The method of claim 12, wherein applying the coating to the glass layer includes:
spraying a coating material in an even layer over exposed surfaces of the glass layer;
pressing the panel with the coating material in a heated mold until the coating material has cross-linked.

18. The method of claim 12, wherein the upper layer, the lower layer, and the at least one interior layer each have a honeycomb structure.

19. A vehicle having at least one multi-dimensional load structure comprising:
a panel having a tiered structure with an upper layer, a lower layer, and at least one interior layer therebetween;
a glass layer applied to surfaces of each of the upper layer, the lower layer, and the at least one interior layer not in contact with an adjacent layer; and
a coating applied to the glass layer;
wherein at least one of:
the at least one interior layer is configured to withstand a greater compressive force than the upper layer and the lower layer; and
the upper layer and the lower layer are lighter than the at least one interior layer.

20. The vehicle of claim 19, wherein the at least one load structure is in the form of at least one of a floor panel and a roof panel.

21. A method of forming a multi-layer load structure comprising:
providing first, second, and third members, each having a thickness and honeycomb configuration;
activating a press to compress the first, second, and third members to create a panel';
applying glass to at least one of said members;
applying a coating to said glass; and
trimming the panel;
wherein the first, second, and third members have different compressive strengths.

\* \* \* \* \*